United States Patent
Itsumi et al.

(10) Patent No.: US 11,620,812 B2
(45) Date of Patent: Apr. 4, 2023

(54) ONLINE DISTILLATION USING FRAME CACHE

(71) Applicant: NEC CORPORATION, Tokyo (JP)

(72) Inventors: Hayato Itsumi, Tokyo (JP); Florian Beye, Tokyo (JP); Yusuke Shinohara, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 17/131,045

(22) Filed: Dec. 22, 2020

(65) Prior Publication Data

US 2021/0201503 A1 Jul. 1, 2021

(30) Foreign Application Priority Data

Dec. 27, 2019 (JP) .............................. JP2019-238139

(51) Int. Cl.
*G06V 10/764* (2022.01)
*G06V 10/98* (2022.01)
(Continued)

(52) U.S. Cl.
CPC ............ *G06V 10/764* (2022.01); *G06V 10/96* (2022.01); *G06V 10/98* (2022.01); *G06V 10/82* (2022.01)

(58) Field of Classification Search
CPC ............ G06V 10/744; G06V 10/7747; G06V 10/7753; G06V 10/776; G06V 10/778;
(Continued)

(56) References Cited

U.S. PATENT DOCUMENTS

| 10,990,850 | B1* | 4/2021 | Chen | ................... G06N 20/00 |
| 2016/0078339 | A1* | 3/2016 | Li | ...................... G06N 3/084 |
| | | | | 706/20 |

(Continued)

FOREIGN PATENT DOCUMENTS

| JP | 2016-191973 A | 11/2016 |
| JP | 2017-224184 A | 12/2017 |

(Continued)

OTHER PUBLICATIONS

Yoshioka, Kentaro, et al. "Dataset Culling: Towards Efficient Training Of Distillation-Based Domain Specific Models." 2019 IEEE International Conference on Image Processing (ICIP). IEEE, 2019. (Year: 2019).*

(Continued)

*Primary Examiner* — Geoffrey E Summers
(74) *Attorney, Agent, or Firm* — Sughrue Mion, PLLC

(57) ABSTRACT

The image analysis apparatus includes: a first analysis unit that analyzes image frames by using a first image analysis model; a second analysis unit that can analyze the image frames by using a second image analysis model an analysis accuracy of which is lower; a storage unit that stores therein analyzed frames, which are already analyzed by using the first and second image analysis models, in association with an evaluation value for evaluating a result of an analysis performed with the second image analysis model; an extraction unit that extracts an analyzed frame that satisfies an extraction condition based on the evaluation value; and an update unit that updates the second image analysis model by using a result of an analysis performed with the first image analysis model on the extracted analyzed frame, and a result of an analysis performed with the first image analysis model on a new frame.

12 Claims, 6 Drawing Sheets

(51) Int. Cl.
*G06V 10/96* (2022.01)
*G06V 10/82* (2022.01)

(58) Field of Classification Search
CPC .......... G06V 10/7784; G06V 10/7792; G06V 10/7796; G06V 10/764; G06V 10/96; G06V 10/98; G06V 10/82; G06N 3/02; G06N 3/08; G06N 3/088
USPC .................................................. 382/155–157
See application file for complete search history.

(56) References Cited

U.S. PATENT DOCUMENTS

| | | |
|---|---|---|
| 2016/0098636 A1 | 4/2016 | Okonogi |
| 2016/0292512 A1 | 10/2016 | Kanna et al. |
| 2019/0087976 A1 | 3/2019 | Sugahara et al. |
| 2019/0251471 A1 | 8/2019 | Morita et al. |
| 2021/0089833 A1* | 3/2021 | Anantha ............... G06K 9/6282 |

FOREIGN PATENT DOCUMENTS

| | | |
|---|---|---|
| JP | 6446971 B2 | 1/2019 |
| JP | 2019-056966 A | 4/2019 |
| WO | 2019/208411 A1 | 10/2019 |

OTHER PUBLICATIONS

Cioppa, Anthony, et al. "ARTHuS: Adaptive Real-Time Human Segmentation in Sports Through Online Distillation." 2019 IEEE/CVF Conference on Computer Vision and Pattern Recognition Workshops (CVPRW). IEEE, 2019. (Year: 2019).*

Mullapudi, Ravi Teja, et al. "Online Model Distillation for Efficient Video Inference." arXiv preprint arXiv:1812.02699v1 (2018). (Year: 2018).*

Ravi Teja Mullapudi et al., "Online Model Distillation for Efficient Video Interface", arXiv 1812.02699, Dec. 2018, 10 pages.

* cited by examiner

| IMAGE FRAME | RESULT DATA | LOSS VALUE |
|---|---|---|
| x#1 | qc_past#1, ql_past#1 | L#1 |
| x#2 | qc_past#2, ql_past#2 | L#2 |
| ... | ... | ... |
| x#N | qc_past#N, ql_past#N | L#N |

2211

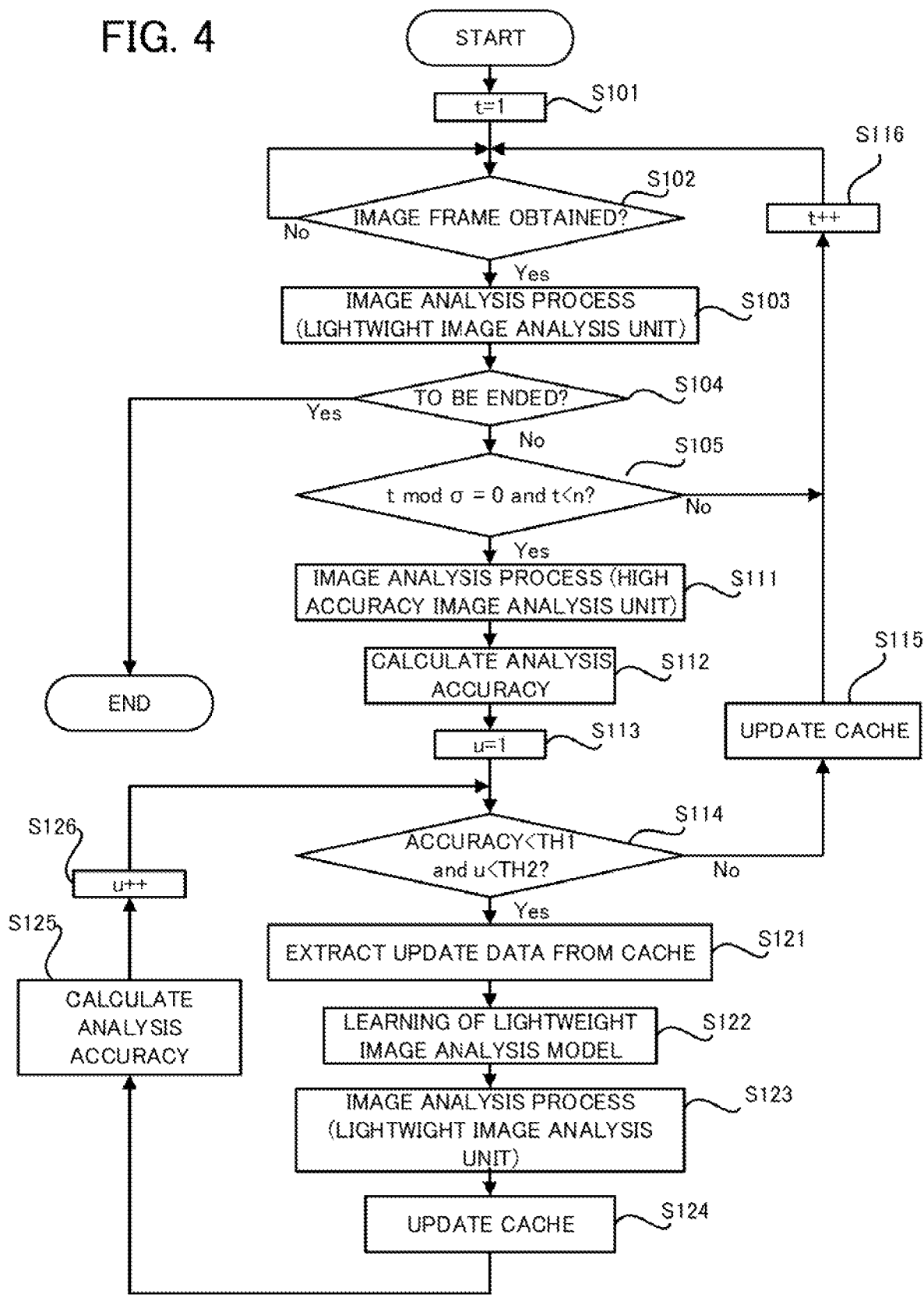

FIG. 5                  221

| IMAGE FRAME | RESULT DATA | LOSS VALUE |
|---|---|---|
| x#1 | qc_past#1, ql_past#1 | L#1 |
| x#2 | qc_past#2, ql_past#2 | L#2 |
| ... | ... | ... |
| x#N | qc_past#N, ql_past#N | L#N | → EXTRACT

FIG. 6                  221

| IMAGE FRAME | RESULT DATA | LOSS VALUE |
|---|---|---|
| x#1 | qc_past#1, ql_past#1 | L#1 |
| x#2 | qc_past#2, ql_past#2 | L#2 |
| ... | ... | ... |
| x#N | qc_past#N, ql_past#N | L'#N ← UPDATE |

FIG. 7                  221

| IMAGE FRAME | RESULT DATA | LOSS VALUE |
|---|---|---|
| x#1 | qc_past#1, ql_past#1 | L#1 |
| x#2 | qc_past#2, ql_past#2 | L#2 | → DISCARD
| ... | ... | ... |
| x#N | qc_past#N, ql_past#N | L#N |
| x#N+1 | qc_past#N+1, ql_past#N+1 | L#N+1 | ← ADD

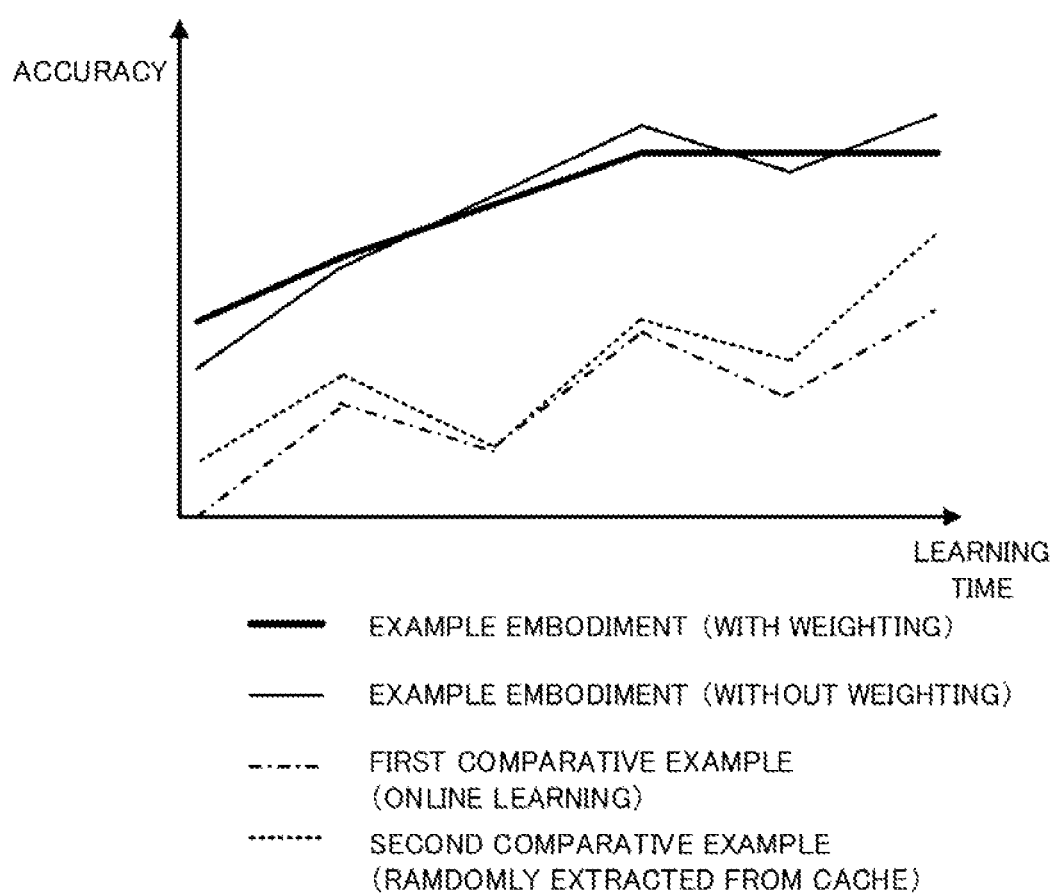

FIG. 9

| IMAGE FRAME | RESULT DATA | LOSS VALUE | CHANGE PARAMETER | |
|---|---|---|---|---|
| x#1 | qc#1, qi#1 | L#1 | I#1 | 2211a |
| x#2 | qc#2, qi#2 | L#2 | I#2 | |
| ... | ... | ... | ... | |
| x#N | qc#N, qi#N | L#N | I#N | |

221a

ONLINE DISTILLATION USING FRAME CACHE

INCORPORATION BY REFERENCE

This application is based upon and claims the benefit of priority from Japanese Patent Application No. 2019-238139, filed on Dec. 27, 2019, the disclosure of which is incorporated herein in its entirety by reference.

TECHNICAL FIELD

Embodiments of the present disclosure relate to an image analysis apparatus, an image analysis method and a program recording medium that are configured to analyze a plurality of image frames that constitute moving image data.

BACKGROUND ART

An example of an image analysis apparatus that analyzes a plurality of image frames that constitute moving image data (in other words, a moving image dataset or a moving image record) is disclosed in a Non-Patent Literature 1. Specifically, the image analysis apparatus disclosed in the Non-Patent Literature 1 uses a relatively lightweight image analysis model to analyze the image frames. Moreover, the image analysis apparatus disclosed in the Non-Patent Literature 1 updates the relatively lightweight image analysis model by allowing the relatively lightweight image analysis model to learn a result of an analysis performed on the image frame by using an image analysis model that is more expensive (as a result, an accuracy of an analysis of which is higher) than the lightweight image analysis model.

In addition, a Patent Literature 1 to a Patent Literature 4 are cited as related art documents related to the present disclosure.

PATENT LITERATURE

[Patent Literature 1] WO2019/208411A1
[Patent Literature 2] JP2019-056966A1
[Patent Literature 3] JP2017-224184A1
[Patent Literature 4] JP2016-191973A1
[Patent Literature 5] JP6446971B

Non-Patent Literature

[Non-Patent Literature 1] Ravi Teja Mullapudi et al., "Online Model Distillation for Efficient Video Interface", arXiv 1812.02699, 6 Dec. 2018

SUMMARY

The image analysis apparatus disclosed in the Non-Patent Literature 1 described above allows an online learning of the relatively lightweight image analysis model. Specifically, the image analysis apparatus disclosed in the Non-Patent Literature 1 analyzes anew image frame that is newly inputted to the image analysis apparatus by using a relatively expensive image analysis model so as to allow the online learning of the relatively lightweight image analysis model. Then, the image analysis apparatus disclosed in the Non-Patent Literature 1 updates the lightweight image analysis model by allowing the relatively lightweight image analysis model to learn the result of the analysis performed with the expensive image analysis model. In this case, the following technical problem arises; there is a limit in improving the accuracy of the analysis of the image frame using the relatively lightweight image analysis model, as compared with a case of allowing an offline learning of the relatively lightweight image analysis model (i.e., allowing the relatively lightweight image analysis model to learn learning data prepared in advance).

In view of the problems described above, it is therefore an example object of the present disclosure to provide an image analysis apparatus, an image analysis method and a program recording medium that can solve the technical problems described above. As one example, the example object of the present disclosure is to provide an image analysis apparatus, an image analysis method and a program recording medium that are configured to improve the accuracy of analysis of an image frame using a relatively lightweight image analysis model.

In an example aspect of the present disclosure, an image analysis apparatus includes: a controller; and a storage unit, wherein the controller is programmed to sequentially obtain a plurality of image frames that constitute moving image data, the controller is programmed to analyze the plurality of image frames by using a first image analysis model, the controller is programmed to analyze the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model, the storage unit stores therein a plurality of analyzed frames, which are image frames of the plurality of image frames that are already analyzed by using the first and second image analysis models, in association with an evaluation value for evaluating a result of an analysis performed by using the second image analysis model on the analyzed frames, the controller is programmed to extract at least one analyzed frame that satisfies a predetermined extraction condition based on the evaluation value, from the plurality of analyzed frames stored in the storage unit, the controller is programmed to update the second image analysis model by using a result of an analysis performed by using the first image analysis model on the extracted analyzed frame and a result of an analysis performed by using the first image analysis model on a new frame that is a newly obtained image frame of the plurality of image frames.

In an example aspect of the present disclosure, an image analysis method, which is performed by a computer, comprising: sequentially obtaining a plurality of image frames that constitute moving image data; analyzing the plurality of image frames by using a first image analysis model; analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model; storing in a storage unit a plurality of analyzed frames, which are image frames of the plurality of image frames that are already analyzed by using the first and second image analysis models, in association with an evaluation value for evaluating a result of an analysis performed by using the second image analysis model on the analyzed frames; extracting at least one analyzed frame that satisfies a predetermined extraction condition based on the evaluation value, from the plurality of analyzed frames stored in the storage unit; and updating the second image analysis model by using a result of an analysis performed by using the first image analysis model on the extracted analyzed frame and a result of an analysis performed by using the first image analysis model on a new frame that is a newly obtained image frame of the plurality of image frames.

In an example aspect of the present disclosure, on a non-transitory program recording medium, computer program for allowing a computer to execute an image analysis method is recorded, the image analysis method including: sequentially obtaining a plurality of image frames that constitute moving image data; analyzing the plurality of image frames by using a first image analysis model; analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model; storing in a storage unit a plurality of analyzed frames, which are image frames of the plurality of image frames that are already analyzed by using the first and second image analysis models, in association with an evaluation value for evaluating a result of an analysis performed by using the second image analysis model on the analyzed frames; extracting at least one analyzed frame that satisfies a predetermined extraction condition based on the evaluation value, from the plurality of analyzed frames stored in the storage unit; and updating the second image analysis model by using a result of an analysis performed by using the first image analysis model on the extracted analyzed frame and a result of an analysis performed by using the first image analysis model on a new frame that is a newly obtained image frame of the plurality of image frames.

BRIEF DESCRIPTION OF THE DRAWINGS

FIG. 3 is a data structure diagram illustrating a data structure of cache data stored in a storage apparatus;

FIG. 4 is a flowchart illustrating a flow of an image analysis operation performed by the image analysis apparatus;

FIG. 5 is a data structure diagram illustrating a situation in which update data are extracted from the cache data;

FIG. 6 is a data structure diagram illustrating a situation in which the cache data is updated;

FIG. 7 is a data structure diagram illustrating a state in which the cache data is updated;

FIG. 8 is a graph illustrating an analysis accuracy of the image analysis process using a lightweight image analysis model updated by the image analysis apparatus according to the example embodiment and an analysis accuracy of the image analysis process using a lightweight image analysis model updated by an image analysis apparatus according to comparative examples; and FIG. 9 is a data structure diagram illustrating a data structure of cache data stored in the storage apparatus.

EXAMPLE EMBODIMENT

Hereinafter, with reference to the drawings, a description will be given to an image analysis apparatus, an image analysis method, and a program recording medium according to example embodiments. A description will be given below to an image analysis system SYS to which the image analysis apparatus, the image analysis method, and the program recording medium.

<1> Configuration of Image Analysis System SYS

<1-1> Overall Configuration of Image Analysis System SYS

Figure 1:
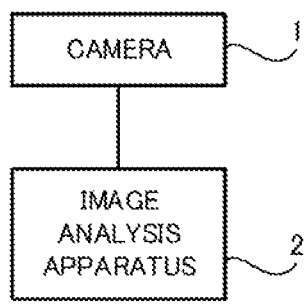
FIG. 1 is a block diagram illustrating an overall configuration of an image analysis system according to an example embodiment.

Firstly, a configuration of an image analysis system SYS according to an example embodiment will be described with reference to FIG. 1. FIG. 1 is a block diagram illustrating the configuration of the image analysis system SYS according to the example embodiment.

As illustrated in FIG. 1, the image analysis system SYS is provided with a camera 1 and an image analysis apparatus 2. The camera 1 and the image analysis apparatus 2 are connected through a data bus. The camera 1 and the image analysis apparatus 2, however, may be connected through a communication network 5 including at least one of a wired communication network and a wireless communication network.

The camera 1 is an imaging device that is configured to image a view included in a predetermined imaging range (in other words, an imaging angle of view) determined by characteristics of an optical system provided by the camera 1. The camera 1 images the imaging range at a predetermined imaging rate (e.g., an imaging rate of imaging the imaging range 30 times per second). As a result, the camera 1 outputs a plurality of image frames each of which represents a situation of the imaging range, as time series data. That is, the camera 1 outputs moving image data (i.e., video data) including a plurality of image frames. In the example embodiment, "data" may be referred to as a "dataset" or "record."

The image analysis apparatus 2 obtains the moving image data outputted by the camera 1. The image analysis apparatus 2 performs an image analysis process using a predetermined image analysis model, on the moving image data obtained from the camera 1. The image analysis model may be, for example, an arithmetic model using a neural network, or may be an arithmetic model having any structure other than the neural network. Moreover, the image analysis apparatus 2 performs a model update process of updating the image analysis model by allowing the image analysis model to learn by using the moving image data obtained from the camera 1.

In the example embodiment, the image analysis apparatus 2 may perform an object detection process as an example of the image analysis process. The object detection process is a process of detecting an object that exists in the imaging range of the camera 1 at a time point when the camera 1 images the imaging range, by using each of the image frames that constitute the moving image data. In other words, the object detection process is a process of detecting an object that is included in an image indicated by each image frame. In the following, a description will be given to an example in which the image analysis apparatus 2 performs the object detection process on the moving image data. The image analysis apparatus 2, however, may perform a process that is different from the object detection process, as an example of the image analysis process.

The object detection process may include a process of detecting an object that is included in an image indicated by the image frame. The process of detecting the object that is included in the image may include a process of specifying a position of the object in the image. The process of specifying the position of the object may include, for example, a process of specifying coordinates (e.g., coordinate values in a two-dimensional coordinate system) of a rectangular area (a so-called box) that includes the object in the image. The object detection process may also include a process of specifying (in other words, identifying or recognizing) a class of the object that is included in the image, in addition to or in place of the process of detecting the object that is included in the image. That is, the object detection process may include a process of specifying the type of the object that is included in the image. In the following, for convenience of illustration, a description will be given to an example in which the object detection process includes the process of specifying both the position of the object and the class of the object.

<1-2> Configuration of Image Analysis Apparatus 2

Figure 2:
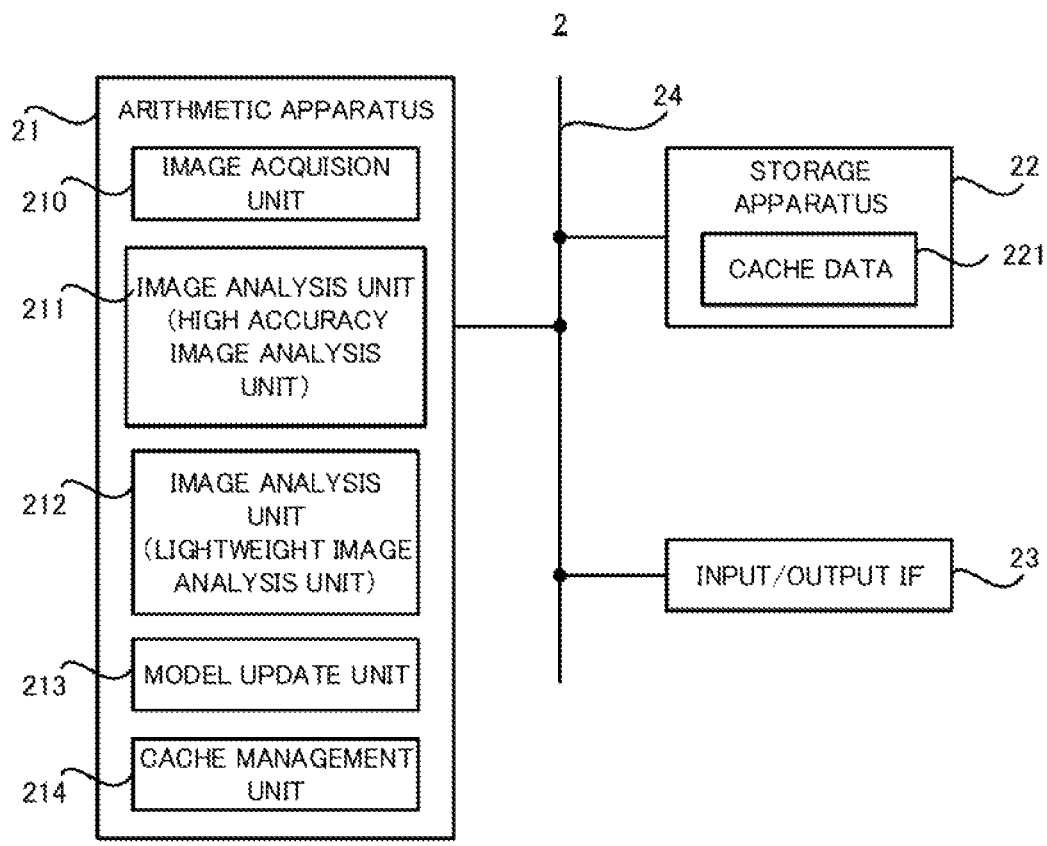
FIG. 2 is a block diagram illustrating a configuration of an image analysis apparatus.

Next, with reference to FIG. 2, a configuration of the image analysis apparatus 2 will be described. FIG. 2 is a block diagram illustrating the configuration of the image analysis apparatus 2.

As illustrated in FIG. 2, the image analysis apparatus 2 is provided with an arithmetic apparatus 21, a storage apparatus 22, and an input/output interface (IF) 23. The arithmetic apparatus 21, the storage apparatus 22, and the input/output IF 23 may be connected through a data bus 24.

The arithmetic apparatus 21 includes at least one of a CPU (Central Processing Unit) and a GPU (Graphic Processing Unit). The arithmetic apparatus 21 reads a computer program. For example, the arithmetic apparatus 21 may read a computer program stored in the storage apparatus 22. For example, the arithmetic apparatus 21 may read a computer program stored in a computer-readable recording medium, by using a not-illustrated recording medium reading apparatus. The arithmetic apparatus 21 may obtain (i.e., may download or read) a computer program from a not-illustrated apparatus disposed outside the image analysis apparatus 2, through a communication apparatus. The arithmetic apparatus 21 executes the read computer program. As a result, a logical function block for performing an operation to be performed by the image analysis apparatus 2 is realized in the arithmetic apparatus 21. Specifically, a logical function block for performing an image analysis operation including the image analysis process and the model update process described above is realized in the arithmetic apparatus 21. That is, the arithmetic apparatus 21 is allowed to function as a controller for realizing the logical function block for performing the operation to be performed by the image analysis apparatus 2.

FIG. 2 illustrates an example of the logical function block realized in the arithmetic apparatus 21 to perform the image analysis operation. As illustrated in FIG. 2, an image acquisition unit 210, an image analysis unit 211, an image analysis unit 212, a model update unit 213, and a cache management unit 214 are realized in the arithmetic apparatus 21. The operation of each of the image analysis unit 211, the image analysis unit 212, the model update unit 213, and the cache management unit 214 will be described in detail later with reference to FIG. 4 and the like, but its outline will be briefly described here.

The image acquisition unit 210 sequentially obtains the plurality of image frames that are outputted by the camera 1 as time series data, through the input/output IF 23.

The image analysis unit 211 is configured to perform the image analysis process on the moving image data (i.e., on each of the image frames that constitute the moving image data). As a result, the image analysis unit 211 outputs a position information ql indicating the position of the object specified by the image analysis unit 211 and a class information qc indicating the class of the object specified by the image analysis unit 211, as a result of the image analysis process.

The image analysis unit 212 is also configured to perform the image analysis process on the moving image data (i.e, on each of the image frames that constitute the moving image data). As a result, the image analysis unit 212 outputs a position information pl indicating the position of the object specified by the image analysis unit 212 and a class information pc indicating the class of the object specified by the image analysis unit 212, as a result of the image analysis process.

The image analysis unit 211 and the image analysis unit 212 may be different in that a processing speed of the image analysis process performed by the image analysis unit 212 is higher than a processing speed of the image analysis process performed by the image analysis unit 211. In other words, the image analysis unit 211 and the image analysis unit 212 may be different in that a time required for completion of the image analysis process performed by the image analysis unit 212 on one image frame is shorter than a time required for completion of the image analysis process performed by the image analysis unit 211 on the same one image frame. Incidentally, the processing speed of the image analysis process is typically higher as a processing load of the image analysis process is lighter. Therefore, the image analysis unit 211 and the image analysis unit 212 may be different in that the processing load of the image analysis process performed by the image analysis unit 212 is lighter than the processing load of the image analysis process performed by the image analysis unit 211. Moreover, as described above, the image analysis process is performed by using the image analysis model. Therefore, it can be said that a state in which "the processing speed of the image analysis process performed by the image analysis unit 212 is higher than the processing speed of the image analysis process performed by the image analysis unit 211" is substantially equivalent to a state in which "the processing speed of the image analysis model used by the image analysis unit 212 is higher than the processing speed of the image analysis model used by the image analysis unit 211".

The image analysis unit 211 and the image analysis unit 212 may be different in that an analysis accuracy (analytical precision) of the image analysis process performed by the image analysis unit 211 is higher than an analysis accuracy of the image analysis process performed by the image analysis unit 212. It can be said that a state in which "the analysis accuracy of the image analysis process performed by the image analysis unit 211 is higher than the analysis accuracy of the image analysis process performed by the image analysis unit 212" is substantially equivalent to a state in which "an analysis accuracy of the image analysis model used by the image analysis unit 211 is higher than an analysis accuracy of the image analysis model used by the image analysis unit 212". Note that in the example embodiment, the image analysis process is the object detection process as described above. For this reason, the analysis accuracy may mean an object detection accuracy that increases as the object that is included in the image indicated by the image frame is detected more correctly. Moreover, the analysis accuracy described herein may mean an analysis accuracy calculated by the image analysis operation (especially, a step S112 in FIG. 4) described later.

Each of the image analysis unit 211 and the image analysis unit 212 performs the image analysis process using the image analysis model described above. Since at least one of the processing speed and the analysis accuracy of the image analysis process differs between the image analysis unit 211 and the image analysis unit 212 as described above, the image analysis model used by the image analysis unit 211 is typically different from the image analysis model used by the image analysis unit 212. However, the image analysis model used by the image analysis unit 211 may be same as the image analysis model used by the image analysis unit 212.

In view of the difference between the image analysis unit 211 and the image analysis unit 212 described above, in the following description, for convenience of explanation, the image analysis unit 211 is referred to as a "high accuracy image analysis unit 211" and the image analysis unit 212 is referred to as a "lightweight image analysis unit 212" to distinguish the two units more clearly. Moreover, the image analysis model used by the image analysis unit 211 is referred to as a "high accuracy image analysis model", and the image analysis model used by the image analysis unit 212 is referred to as a "lightweight image analysis model" to distinguish between the two models.

The image analysis apparatus 2 including the high accuracy image analysis unit 211 and the lightweight image analysis unit 212 may normally perform the image analysis process by using the lightweight image analysis unit 212. In this case, the image analysis apparatus 2 is allowed to perform the image analysis process at a relatively high speed with a relatively light processing load. On the other hand, since the analysis accuracy of the image analysis process performed by the lightweight image analysis unit 212 by using the lightweight image analysis model is relatively low, it can be said that there is room for improvement in the lightweight image analysis model. Here, since the analysis accuracy of the image analysis process performed by the high accuracy image analysis unit 211 is higher, the result of the image analysis process performed by the high accuracy image analysis unit 211 is relatively highly reliable. For this reason, the image analysis apparatus 2 may update the lightweight image analysis model used by the lightweight image analysis unit 212, by using the result of the image analysis process performed by the high accuracy image analysis unit 211. In other words, the image analysis apparatus 2 may update the lightweight image analysis model by allowing the lightweight image analysis model to learn the result of the image analysis process performed by the high accuracy image analysis unit 211.

The model update unit 213 performs the model update process. Especially in the example embodiment, the model update unit 213 updates the lightweight image analysis model used by the lightweight image analysis unit 212 as described above. Specifically, the model update unit 213 calculates a value L of a loss function (hereinafter referred to as a "loss value L") on the basis of the position information $ql$ and the class information $qc$ outputted by the image analysis unit 211 and the position information $pl$ and the class information $pc$ outputted by the image analysis unit 212. The loss value L corresponds to an evaluation value for evaluating the result of the image analysis process performed by the lightweight image analysis unit 212. The loss value L may be, for example, a sum of a loss value relating to the position of the object and a loss value relating to the class of the object. As an example of the loss value relating to the position of the object, a loss value SL referred to as a Smooth L1 Loss may be used. The loss value SL may use a loss value expressed by a formula 1: "$SL=0.5 \times (ql-pl)^2$ when $|ql-pl|$ is smaller than 1 and $SL=|ql-pl|-0.5$: when $|ql-pl|$ is not smaller than 1". As an example of the loss value relating to the class of the object, a loss value FL referred to as a Focal Loss may be used. The loss value FL is expressed by a formula 2: "$FL=(qc-pc) \times \gamma \times CE(qc, pc)$". Incidentally, "$\gamma$" in the formula 2 is a parameter, and $CE(qc, pc)$ is a cross entropy between the class information $qc$ and the class information $pc$. Then, the model update unit 213 updates the lightweight image analysis model on the basis of the loss value L. For example, the loss value L corresponding to the sum of the loss value FL and the loss value SL described above decreases more as a result of the image analysis process performed by the lightweight image analysis unit 212 becomes better. In this case, the model update unit 213 preferably updates the lightweight image analysis model so as to reduce (typically, minimize) the loss value L. In this paragraph, a symbol "$|x|$" represents the absolute value of x, and a symbol "$x^y$" represents "y-th order exponentiation of x".

The cache management unit 214 manages cache data 221 used by the model update unit 213 to perform the model update process. For example, as illustrated in FIG. 3 that is a data structure diagram illustrating an example of a data structure of the cache data 221, the cache data 221 may include a plurality of update data 2211, each of which includes: the image frame on which the high accuracy image analysis unit 211 (and moreover, the lightweight image analysis unit 212) performed the image analysis process in the past (hereinafter it is referred to as an "analyzed frame" as occasion demands); the result of the image analysis process performed by the high accuracy image analysis unit 211 on the analyzed frame in the past; and the loss value L for evaluating the result of the image analysis process performed by the lightweight image analysis unit 212 on the analyzed frame in the past. In other words, the cache data 221 may include the plurality of update data 2211 in which the analyzed frame, the result of the image analysis process performed by the high accuracy image analysis unit 211 in the past, and the loss value L are associated with one another. In the example illustrated in FIG. 3, the cache data 221 includes N update data 2211 (wherein N is an integer of 2 or more). Moreover, in the example illustrated in FIG. 3, the update data 2211 includes the position information $ql$ indicating the position of the object specified by the high accuracy image analysis unit 211 from the analyzed frame and the class information $qc$ indicating the class of the object specified by the high accuracy image analysis unit 211 from the analyzed frame, as the result of the image analysis process performed by the high accuracy image analysis unit 211 in the past. In the following, the position information $ql$ and the class information $qc$ specified from the analyzed frame (i.e., the image frame obtained in the past) are respectively referred to as a position information $ql\_past$ and a class information $qc\_past$. In the same manner, the position information $pl$ and the class information $pc$ specified from the analyzed frame (i.e., the image frame obtained in the past) are respectively referred to as a position information $pl\_past$ and a class information $pc\_past$.

The storage apparatus 22 is configured to store therein desired data. For example, the storage apparatus 22 may temporarily store a computer program to be executed by the arithmetic apparatus 21. The storage apparatus 22 may temporarily store data that is temporarily used by the arithmetic apparatus 21 when the arithmetic apparatus 21 executes the computer program. The storage apparatus 22 may store the data that is stored for a long term stored by the image analysis apparatus 2. Especially in the example embodiment, the storage apparatus 22 stores the cache data 221 described above. Incidentally, the storage apparatus 22 may include at least one of a RAM (Random Access Memory), a ROM (Read Only Memory), a hard disk device, a magneto-optical disk device, an SSD (Solid State Drive) and a disk array device.

The input/output IF 23 is an apparatus for transmitting and receiving data between the image analysis apparatus 2 and the camera 1. Therefore, the image analysis apparatus 2 obtains the moving image data (i.e., image data) from the camera 1 through the input/output IF 23.

<2> Operation of Image Analysis System SYS

Next, the operation of the image analysis system SYS will be described. Hereinafter, with reference to FIG. 4, the image analysis operation performed by the image analysis apparatus 2 (i.e., an operation including the image analysis process and the model update process described above) will be described as at least a part of the operation performed by the image analysis system SYS. FIG. 4 is a flowchart illustrating a flow of the image analysis operation performed by the image analysis apparatus 2.

As illustrated in FIG. 4, the arithmetic apparatus 21 initializes a variable t to 1 (step S101). The variable t is a variable indicating the number of image frames obtained by the image analysis apparatus 2 from the camera 1 after the image analysis apparatus 2 starts the image analysis operation.

Then, when the image acquisition unit 210 newly obtains an image frame from the camera 1 through the input/output IF 23 (step S102: Yes), the lightweight image analysis unit 212 performs the image analysis process (i.e., the object detecting process) using the lightweight image analysis model, on the image frame newly obtained in the step S102 (step S103).

Then, the arithmetic apparatus 21 determines whether or not the image analysis operation is to be ended (step S104). When it is determined that the image analysis operation is to be ended, the image analysis apparatus 2 ends the image analysis operation illustrated in FIG. 4.

On the other hand, when it is determined that the image analysis operation is not to be ended (the step S104: No), the model update unit 213 determines whether or not the lightweight image analysis model is to be updated by using the image frame newly obtained in the step S102 (step S105). In the example illustrated in FIG. 4, the model update unit 213 determines whether or not the lightweight image analysis model is to be updated by determining whether or not a remainder obtained by dividing the variable t by a parameter σ is 0 and whether or not the variable t is less than a parameter n (the step S105). The parameter σ is a numerical parameter that defines an update cycle of the lightweight image analysis model. Specifically, the parameter σ is a numerical parameter that defines the update cycle such that the lightweight image analysis model is updated at each time when σ image frames are obtained. The parameter n is a numerical parameter that defines a duration of continuing to update the lightweight image analysis model. Specifically, the parameter n is a numerical parameter that defines the duration of the model update process so as to stop the update of the lightweight image analysis model at a time point when n image frames are obtained after the image analysis apparatus 2 starts the image analysis operation. That is, the parameter n is a numerical parameter that defines the duration such that the lightweight image analysis model is updated until n image frames are obtained after the image analysis apparatus 2 starts the image analysis operation and such that the lightweight image analysis model is not updated after the n image frames are obtained after the image analysis apparatus 2 starts the image analysis operation.

As a result of the determination in the step S105, when it is determined that the remainder obtained by dividing the variable t by the parameter σ is not 0 (the step S105: No), it is presumed that a present timing is not a timing for updating the lightweight image analysis model. Therefore, the model update unit 213 does not update the lightweight image analysis model by using the image frame newly obtained in the step S102. In this case, the model update unit 213 increments the variable t by 1 (step S116). Then, the process after the step S102 is repeated.

As a result of the determination in the step S105, when it is determined that the remainder obtained by dividing the variable t by the parameter σ is 0 and it is determined that the variable t is larger than or equal to the parameter n (the step S105: No), it is presumed that the duration of continuing to update the lightweight image analytical model has elapsed. Therefore, the model update unit 213 does not update the lightweight image analysis model by using the image frame newly obtained in the step S102. In this case, the model update unit 213 increments the variable t by 1 (the step S116). Then, the process after the step S102 is repeated. In this case, however, the lightweight image analysis model is not updated as a general rule because the variable t will not be less than parameter n unless the variable t is initialized.

On the other hand, as a result of the determination in the step S105, when it is determined that the remainder obtained by dividing the variable t by the parameter σ is 0 and the variable t is less than the parameter n (the step S105: Yes), the model update unit 213 updates the lightweight image analysis model by using the image frame newly obtained in the step S102 (step S111 to step S126).

Specifically, the model update unit 213 controls the high accuracy image analysis unit 211 so as to perform the image analysis process on the image frame newly obtained in the step S102 (hereinafter, referred to as a "new frame") (step S111).

Then, the model update unit 213 calculates the analysis accuracy of the lightweight image analysis unit 212 by using a result of the image analysis process performed by the lightweight image analysis unit 212 in the step S103 and a result of the image analysis process performed by the high accuracy image analysis unit 211 in the step S111 (step S112). An example of a process of calculating the analysis accuracy will be described below.

Firstly, the result of the image analysis process performed by the high accuracy image analysis unit 211 in the step S111 includes the position information ql indicating the position of the object specified by the high accuracy image analysis unit 211 and the class information qc indicating the class of the object specified by the high accuracy image analysis unit 211. In the same manner, the result of the image analysis process performed by the lightweight image analysis unit 212 in the step S103 includes the position information pl indicating the position of the object specified by the lightweight image analysis unit 212 and the class information pc indicating the class of the object specified by the lightweight image analysis unit 212. In the following, the position information ql, the class information qc, the position information pl, and the class information pc specified from the image frame newly obtained in the step S102 are respectively referred to as a position information ql_current, a class information qc_current, a position information pl_current and a class information pc_current. In this case, the model update unit 213 may calculate the accuracy of the position information pl_current and the class information pc_current as the analysis accuracy of the image analysis process performed by the lightweight image analysis unit 212, by using the position information ql_current and the class information qc_current as correct answer data. At this time, the model update unit 213 may calculate the accuracy of the position information pl_current and the class information pc_current as the analysis accuracy of the lightweight image analysis unit 212, by using the position information ql_current and the class information qc_current a reliability of each of which is equal to or larger than 0.5, as correct answer data. Incidentally, as the analysis accuracy, an existing index value indicating the accuracy of the image analysis process (especially, the object detection process) may be used. An example of the existing index value includes at least one of mAP (mean Average Precision) and IoU (Intersection over Union).

Then, the model update unit 213 initializes a variable u to 1 (step S113). The variable u is a variable that indicates the number of times that the lightweight image analysis model is updated by the model update process.

Then, the model update unit 213 determines whether or not the analysis accuracy calculated in the step S112 is less than a lower limit threshold TH1 and whether or not the variable u is less than an upper limit threshold TH2 (step S114). The lower limit threshold TH1 is a threshold value that is compared with the analysis accuracy to determine whether or not the analysis accuracy of the lightweight image analysis unit 212 is high enough to allow the lightweight image analysis unit 212 to perform an appropriate image analysis process on the image frame. A state in which the analysis accuracy of the lightweight image analysis unit 212 is less than the lower limit threshold TH1 corresponds to a state in which the analysis accuracy of the lightweight image analysis unit 212 is too low to allow the lightweight image analysis unit 212 to perform an appropriate image analysis process on the image frame. A state in which the analysis accuracy of the lightweight image analysis unit 212 is larger than or equal to the lower limit threshold TH1 corresponds to a state in which the analysis accuracy of the lightweight image analysis unit 212 is high enough to allow the lightweight image analysis unit 212 to perform an appropriate image analysis process on the image frame. The upper limit threshold TH2 is a threshold that defines an upper limit value of the variable u (i.e., the number of times that the lightweight imaging model is updated).

As a result of the determination in the step S114, when it is determined that the analysis accuracy calculated in the step S112 is less than the predetermined threshold TH1 and the variable u is less than the predetermined threshold TH2 (Step S114: Yes), it is presumed that the lightweight image analysis model is preferably updated by the model update process because the analysis accuracy of the lightweight image analysis unit 212 is not yet sufficiently high. Therefore, in this case, the image analysis apparatus 2 actually updates the lightweight image analysis model (step S121 to step S122).

Specifically, the cache management unit 214 extracts at least one update data 2211 to be used to update the lightweight image analysis model, from the cache data 221 (step S121). That is, the cache management unit 214 extracts, from the cache data 221, the analyzed frame, the result of the image analysis process performed by the high accuracy image analysis unit 211 in the past, and the loss value L, as data to be used to update the lightweight image analysis model.

In the example embodiment, the cache management unit 214 extracts, for example, at least one update data 2211 that satisfies a predetermined extraction condition based on the loss value L. For example, the loss value L typically decreases more as the result of the image analysis process performed by the lightweight image analysis unit 212 becomes better. That is, the loss value L decreases more as a difference between the result of the image analysis process performed by the lightweight image analysis unit 212 and the result of the image analysis process performed by the high accuracy image analysis unit 211 is smaller. Therefore, it can be said that the analyzed frame included in the update data 2211 including a relatively large loss value L is an image frame in which it is relatively difficult for the lightweight image analysis model to detect an object, as compared with the analyzed frame included in the update data 2211 including a relatively small loss value L. In other words, it can be said that the analyzed frame included in the update data 2211 including a relatively large loss value L is an image frame that is not sufficiently learned by the lightweight image analysis model (i.e., that is relatively hard for the lightweight image analysis model to analyze). In this case, when the lightweight image analysis model is updated by using the image frame that is not sufficiently learned, the result of the image analysis process using the lightweight image analysis model is expectedly improved, relatively significantly, as compared with a case in which the lightweight image analysis model is updated by using an image frame that is sufficiently learned. Therefore, the cache management unit 214 may extract the update data 2211 including a relatively large loss value L.

For example, as illustrated in FIG. 5 that illustrates a situation in which the update data 2211 are extracted from the cache data 221, when a loss value L #N is larger than the other loss values L #1 to L #N−1, the cache management unit 214 may extract the update data 2211 including: the loss value L #N; an analyzed frame x #N associated with the loss value L #N; and a position information ql_past #N and a class information qc_past #N associated with the loss value L #N.

To extract the update data 2211 including a relatively large loss value L, an extraction condition may include a condition relating to the magnitude of the loss value L. For example, the extraction condition may include such a condition that a probability of extracting the update data 2211 increases more as the loss value L is larger. For example, the extraction condition may include such a condition that the update data 2211 including the maximum loss value L are extracted. For example, the extraction condition may include such a condition that the update data 2211 in which the loss value L is larger than a predetermined extraction threshold value are extracted. For example, the extraction condition may include such a condition that a predetermined number of update data 2211 are extracted in descending order of the loss value L. Even when any of the extraction conditions is used, the cache management unit 214 is allowed to extract the update data 2211 including a relatively large loss value L.

Then, the model update unit 213 updates the lightweight image analysis model by using the image frame included in the update data 2211 extracted in the step S121 (i.e., the analyzed frame) and the image frame newly obtained in the step S102 (i.e., the new frame) (step S122). In other words, the model update unit 213 updates the lightweight image analysis model by allowing the lightweight image analysis model to learn both the analyzed frame and the new frame (step S122).

To update the lightweight image analysis model, the model update unit 213 calculates a loss value L corresponding to the analyzed frame (hereinafter it is referred to as a "loss value L_past") and a loss value L corresponding to the new frame (hereinafter it is referred to as "loss value L_current"). The loss value L_past is a value of the loss function for evaluating a result of the image analysis process performed by the lightweight image analysis apparatus 211 on the analyzed frame included in the update data 2211 extracted in the step S121. On the other hand, the loss value L_current is a value of the loss function for evaluating a result of the image analysis process performed by the lightweight image analysis apparatus 211 on the new frame newly obtained in the step S102.

In order to calculate the loss value Least, the model update unit 213 controls the lightweight image analysis unit 212 so as to perform the image analysis process on the analyzed frame extracted in the step S121. As a result, the model update unit 213 obtains the position information pl_past indicating the position of the object specified by the light image analysis unit 212 from the analyzed frame and the class information pc_past indicating the class of the object specified by the light image analysis unit 212 from the analyzed frame. Moreover, the model update unit 213 obtains, from the update data 2211 extracted in the step S121, the position information ql_past indicating the position of the object specified by the high accuracy image analysis unit 211 from the analyzed frame and the class information qc_past indicating the class of the object specified by the high accuracy image analysis unit 211 from the analyzed frame. Then, the model update unit 213 calculates the loss value L_past on the basis of the position information pl_past, the class information pc_past, the position information ql_past, and the class information qc_past. For example, the model update unit 213 calculates the loss value L_past by using the formulas 1 and 2 for calculating the loss value L described above.

Furthermore, the model update unit 213 calculates the loss value L_current by using the result of the image analysis process performed by the lightweight image analysis unit 212 in the step S103 and the result of the image analysis process performed by the high accuracy image analysis unit 211 in the step S111. That is, the model update unit 213 calculates the loss value L_current on the basis of the position information pl_current, the class information pc_current, the position information ql_current, and the class information qc_current.

Then, the model update unit 213 calculates a loss value L_total corresponding to the sum of the loss value L_past and the loss value L_current, as the loss value L that is used to update the lightweight image analysis model. That is, the model update unit 213 updates the lightweight image analysis model on the basis of the loss value L_total. In other words, the model update unit 213 updates the lightweight image analysis model by allowing the lightweight image analysis model to learn on the basis of the loss value L_total. For example, the model update unit 213 updates the lightweight image analysis model, by updating parameters or the like that constitute the lightweight image analysis model so as to reduce (typically, minimize) the loss value L_total. For example, when the lightweight image analysis model is an arithmetic model using a neural network, the model update unit 213 updates the lightweight image analysis model by allowing it to learn parameters of the neural network (e.g., at least one of weight, bias, and a connection path of nodes) so as to reduce (typically, minimize) the loss value L_total.

The model update unit 213 may perform a weighting process on at least one of the loss value L_past and the loss value L_current, when calculating the loss value L_total. For example, the model update unit 213 may calculate the loss value L_total by using a formula: $L\_total = \alpha \times L\_current + (1-\alpha) \times L\_past$. In this case, a indicates a weighting factor and is set to be a value that is larger than 0 and less than 1. When the weighting factor $\alpha$ is set to 1, the lightweight image analysis model is updated without using the loss value L_past. That is, the lightweight image analysis model is updated by using the new frame without using the analyzed frame included in the update data 2211.

On the other hand, a degree of contribution of the loss value L_past to the update of the lightweight image analysis model is larger as the weighting factor $\alpha$ is smaller. In this case, the temporal versatility of the lightweight image analysis model increases. That is, the lightweight image analysis model is less likely an image analysis model having relatively low versatility specialized for the most recently inputted image frame. In other words, the lightweight image analysis model is less likely an image analysis model of relatively low versatility that overlearns the most recently inputted image frame. In terms of increasing a degree of the increase in the temporal versatility of the lightweight image analysis model, the weighting factor $\alpha$ may be set to be a value that is less than 0.5.

When the lightweight image analysis model is updated, the loss value L_past corresponding to the analyzed frame likely varies. Typically, when the lightweight image analysis model is updated, the loss value L_past corresponding to the analyzed frame is relatively likely small. This is because the lightweight image analysis model is updated so as to reduce the loss value L_total and thus the loss value L_past that constitutes the loss value L_total may be also small. For this reason, when the lightweight image analysis model is updated, the cache management unit 214 updates the cache data 221 by using the loss value L_past that varies due to the update of the lightweight image analysis model (step S123 to step S124). Specifically, the cache management unit 214 controls the lightweight image analysis unit 212 so as to perform the image analysis process on the processed data extracted in the step S121 by using the updated lightweight image analysis model (step S123). As a result, the cache management unit 214 obtains the position information pl_past indicating the position of the object specified by using the lightweight image analysis model from the analyzed frame, and the class information pc_past indicating the class of the object specified by using the lightweight image analysis model from the analyzed frame. Then, the cache management unit 214 calculates the loss value L_past that varies due to the update of the lightweight image analysis model, by using the position information pl_past and the class information pc_past obtained in the step S123 and the position information ql_past and the class information qc_past extracted in the step S121. Then, the cache management unit 214 changes the loss value L included in the update data 2211 extracted in the step S121, from the loss value L_past obtained before the update of the lightweight image analysis model, to the loss value L_past obtained after the update of the lightweight image analysis model (step S124).

For example, as illustrated in FIG. 6 that illustrates a situation in which the cache data 221 are updated, when the lightweight image analysis model is updated by using the update data 2211 including the analyzed frame x #N, the loss value L #N included in the update data 2211 including the analyzed frame x #N is updated. That is, the loss value L #N is changed to a loss value L'#N obtained after the update of the lightweight image analysis model.

Then, the model update unit 213 calculates the analysis accuracy of the lightweight image analysis unit 212 obtained after the update of the lightweight image analysis model, by using the result of the image analysis process performed by the lightweight image analysis unit 212 in the step S123 and the result of the image analysis process performed by the high accuracy image analysis unit 211 in the step S111 (step S125). Incidentally, a detailed description of the process in the step S125 will be omitted because the process may be the same as that in the step S112.

After that, the model update unit 213 increments the variable u by 1 (step S126) and then repeats the process after the step S114. When the analysis accuracy is newly calculated in the step S125 after the analysis accuracy is calculated in the step S112, the model update unit 213 determines in the step S114 whether or not the analysis accuracy calculated in the step S125 is less than the lower limit threshold TH1, instead of the analysis accuracy calculated in the step S112.

On the other hand, as a result of the determination in the step S114, when it is determined that the analysis accuracy calculated in the step S112 (or the step S125) is larger than or equal to the predetermined threshold TH1 (the step S114: No), it is presumed that the necessity of updating the lightweight image analysis model by the model update process is relatively low because the analysis accuracy of the lightweight image analysis unit 212 is already sufficiently high. Therefore, in this case, the model update unit 213 ends the model update process for updating the lightweight image analysis model.

Moreover, as a result of the determination in the step S114, when it is determined that the variable u is larger than or equal to the predetermined threshold TH2 (the step S114: No), it is presumed that the number of times that the lightweight image analysis model is updated by the model update process already reaches the upper limit. Therefore, in this case, the model update unit 213 ends the model update process for updating the lightweight image analysis model.

After the process of updating the lightweight image analysis model is ended, the cache management unit 214 updates the cache data 221 (step S115). Specifically, as illustrated in FIG. 7 that illustrates a situation in which the cache data 221 are updated, the cache management unit 214 adds the update data 2211 including the image frame obtained in the step S102 as the analyzed frame (an analyzed frame x #N+1 in the example illustrated in FIG. 7) to the cache data 221. The newly added update data 2211 includes the result of the image analysis process performed in the step S111 by the high accuracy image analysis unit 211 on the new frame obtained in the step S102 (i.e., the position information ql_current and the class information qc_current) as the position information ql_past and the class information qc_past. Moreover, the newly added update data 2211 includes the loss value L_current calculated in the step S123 as the loss value L corresponding to the new frame obtained in the step S102.

Furthermore, when the data size of the cache data 221 exceeds an upper limit size due to the addition of the update data 2211, the cache management unit 214 may discard (i.e., delete) at least one update data 2211 from the cache data 221.

In the example embodiment, the cache management unit 214 may delete, for example, at least one update data 2211 that satisfies a predetermined discard condition based on the loss value L. For example, as described above, the analyzed frame included in the update data 2211 including a relatively large loss value L is an image frame in which it is relatively hard to detect an object for the lightweight image analysis model used by the lightweight image analysis unit 212. Conversely, the analyzed frame included in the update data 2211 including a relatively small loss value L is an image frame in which it is relatively easy to detect an object for the lightweight image analysis model used by the lightweight image analysis unit 212. That is, the analyzed frame included in the update data 2211 including a relatively small loss value L is likely to be an image frame that is sufficiently learned by the lightweight image analysis model. In this case, even when the lightweight image analysis model is updated by using the sufficiently learned image frame, there is a limit to the amount of improvement in the result of the image analysis process using the lightweight image analysis model, as compared with a case in which the lightweight image analysis model is updated by using the image frame that is not sufficiently learned. Therefore, the model update unit 213 may discard the update data 2211 including a relatively small loss value L.

For example, as illustrated in FIG. 7 that illustrates a situation in which the update data 2211 are discarded from the cache data 221, when the loss value L #2 is smaller than the other loss value L #1 and the loss values L #3 to L #N+1, the cache management unit 214 may discard the update data 2211 including: the loss value L #2; the analyzed frame x #2 associated with the loss value L #2; and the position information ql_past #2 and the class information qc_past #2 associated with the loss value L #2.

To discard the update data 2211 including a relatively small loss value L, the discard condition may include a condition relating to the magnitude of the loss value L. For example, the discard condition may include such a condition that a probability of discarding the update data 2211 increases more as the loss value L is smaller. For example, the discard condition may include such a condition that the update data 2211 including the minimum loss value L are discarded. For example, the discard condition may include such a condition that the update data 2211 in which the loss value L is less than a predetermined discard threshold are discarded. For example, the discard condition may include a condition that a predetermined number of update data 2211 are extracted in ascending order of the loss value L. Even when any of the discard conditions is used, the cache management unit 214 is allowed to discard the update data 2211 including a relatively small loss value L.

<3> Technical Effects of Image Analysis System SYS

As described above, according to the image analysis system SYS of the example embodiment, the image analysis apparatus 2 is configured to update the lightweight image analysis model by using not only the image frame newly obtained from the camera 1 but also the update data 2211 included in the cache data 221. That is, the image analysis apparatus 2 is configured to update the lightweight image analysis model by using the analyzed frame that was used to update the lightweight image analysis model in the past. Therefore, the analysis accuracy of the image analysis process using the lightweight image analysis model is improved, as compared with a case in which the lightweight image analysis model is updated by using only the image frame newly obtained from the camera 1. For example, FIG. 8 illustrates the analysis accuracy of the image analysis process using the lightweight image analysis model updated (i.e., learned) by the image analysis apparatus 2 according to the example embodiment by a solid line. On the other hand, FIG. 8 illustrates the analysis accuracy of the image analysis process using a lightweight image analysis model updated by using only the image frame newly obtained from the camera 1 (a first comparative example) by a one-dot chain line. As illustrated in FIG. 8, it can be seen that the analysis accuracy of the image analysis process using the lightweight image analysis model updated by the image analysis apparatus 2 according to the example embodiment is higher than the analysis accuracy of the image analysis process using the lightweight image analysis model according to the first comparative example that is updated by using only the image frame newly obtained from the camera 1.

Moreover, the image analysis apparatus 2 extracts at least one update data 2211 that satisfies the extraction condition based on the loss value L, as the update data 2211 used to update the lightweight image analysis model. As a result, the analysis accuracy of the image analysis process using the lightweight image analysis model is improved, as compared with a case in which the lightweight image analysis model is updated by using the update data 2211 that are extracted randomly (i.e., without considering the loss value L) from the cache data 221. This is because at least one update data 2211 that satisfies the extraction condition based on the loss value L includes the image frame that is not sufficiently learned by the lightweight image analysis model, and thus, the lightweight image analysis model preferentially learns the image frame that is not sufficiently learned. For example, FIG. 8 illustrates the analysis accuracy of the image analysis process using a lightweight image analysis model updated using the update data 2211 that are randomly extracted from the cache data 221 (second comparative example) by a dotted line. As illustrated in FIG. 8, it can be seen that the analysis accuracy of the image analysis process using the lightweight image analysis model updated by the image analysis apparatus 2 according to the example embodiment is higher than the analysis accuracy of the image analysis process using the lightweight image analysis model of the second comparative example that is updated by using the update data 2211 that are randomly extracted from the cache data 221.

Furthermore, the weighting process, which is performed on at least one of the loss value L_past and the loss value L_current when the loss value L_total is calculated as described above, reduces variation in the analysis accuracy of the image analysis process using the lightweight image analysis model. This is because, as described above, the weighting process increases the temporal versatility of the lightweight image analysis model. In particular, the effect of reducing the variation in the analysis accuracy of the image analysis process is more pronounced when the weighting factor $\alpha$ is set to a value that is less than 0.5. For example, FIG. 8 illustrates the analysis accuracy of the image analysis process using a lightweight image analysis model (with weighting) updated by the image analysis apparatus 2 by using the weighting coefficient $\alpha$ that is set to be less than 0.5 by a thick solid line, and the analysis accuracy of the image analysis process using a lightweight image analysis model (without weighting) updated by the image analysis apparatus 2 without using the weighting coefficient $\alpha$ by a thin solid line. As illustrated in FIG. 8, it can be seen that the variation in the analysis accuracy of the image analysis process is reduced when the weighting factor $\alpha$ is set to be less than 0.5.

<4> Modified Example

In the above-described description, the image analysis apparatus 2 extracts the update data 2211 that satisfies the extraction condition relating to the magnitude of the loss value L, in order to extract the update data 2211 including a relatively large loss value L as the update data 2211 to be used to update the lightweight image analysis model. On the other hand, the image analysis apparatus 2 may extract the update data 2211 that satisfies another extraction condition relating to the loss value L.

For example, as described above, it is likely that the loss value L_past corresponding to the analyzed frame used to update the lightweight image analysis model changes at each time when the lightweight image analysis model is updated. In particular, as described above, the loss value L_past corresponding to the analyzed frame used to update the lightweight image analysis model likely becomes smaller at each time when the lightweight image analysis model is updated. On the other hand, if the loss value L_past corresponding to the analyzed frame used to update the lightweight image analysis model becomes large when the lightweight image analysis model is updated, it is presumed that a learning effect using the analyzed frame is reduced. In other words, it is presumed that the updated lightweight image analysis model forgets a result of the learning using the analyzed frame used to update the lightweight image analysis model. In this case, it can be said that the analyzed frame used to update the lightweight image analysis model when the loss value L_past increases due to the update of the lightweight image analysis model is an image frame that is preferably to be learned again by the lightweight image analysis model. In this case, when the lightweight image analysis model is updated by using the image frame that is preferably to be learned again, the result of the image analysis process using the lightweight image analysis model is expectedly improved, relatively significantly, as compared with a case in which the lightweight image analysis model is updated by using the image frame that does not need to be learned again. Therefore, the model update unit 213 may preferentially extract the update data 2211 in which the loss value L_past increases due to the update of the lightweight image analysis model, over the update data 2211 in which the loss value L_past does not increase due to the update of the lightweight image analysis model.

In order to preferentially extract the update data 2211 in which the loss value L_past increases due to the update of the lightweight image analysis model, the extraction condition may include a condition relating to the amount of change in the loss value L_past due to the update of the lightweight image analysis model. That is, the extraction condition may include a condition relating to a magnitude relationship between the loss value L_past before the update of the lightweight image analysis model and the loss value L_past after the update of the lightweight image analysis model. In particular, the extraction conditions may include a condition relating to the increase in the loss value L_past after the update of the lightweight image analysis model with respect to the loss value L_past before the update of the lightweight image analysis model. For example, the extraction condition may include such a condition that the probability of extracting the update data 2211 increases more as a ratio of the number of times that the loss value L_past increases due to the update of the lightweight image analysis model using one analyzed frame with respect to the number of times that the lightweight image analysis model is updated by using the one analyzed frame (i.e., the number of execution times of the step S112 in FIG. 4) increases more.

For the same reason, even when the update data 2211 is discarded from the cache data 221 in the step S115 in FIG. 4, the cache management unit 214 may preferentially discard the update data 2211 in which the loss value L_past does not increase due to the update of the lightweight image analysis model, over the update data 2211 in which the loss value L_past increases due to the update of the lightweight image analysis model. In order to discard the update data 2211 in which the loss value L_past does not increase due to the update of the lightweight image analysis model, the discard condition may include a condition relating to the amount of change in the loss value L_past due to the update of the lightweight image analysis model. That is, the discard condition may include a condition relating to a magnitude relationship between the loss value L_past before the update of the lightweight image analysis model and the loss value L_past after the update of the lightweight image analysis model. In particular, the discard condition may include a condition relating to the increase in the loss value L_past after the update of the lightweight image analysis model with respect to the loss value L_past before the update of the lightweight image analysis model. For example, the discard condition may include such a condition that the probability of discarding the update data 2211 increases more as a ratio of the number of times that the loss value L_past increases due to the update of the lightweight image analysis model using one analyzed frame with respect to the number of times that the lightweight image analysis model is updated by using the one analyzed frame (i.e., the number of execution times of the step S112 in FIG. 4) decreases more.

When at least one of the extraction condition and the discard condition includes a condition relating to the amount of change in the loss value L_pass due to the update of the lightweight image analysis model, cache data 221a including a parameter indicating the amount of change in the loss value L_pass due to the update of the lightweight image analysis model (referred to as a "change parameter" in FIG. 9) may be stored by the storage apparatus 22, instead of the above-described cache data 221, as illustrated in FIG. 9. That is, the storage apparatus 22 may store therein the cache data 221a including a plurality of update data 2211a that are different from the above-described update data 2211 in that the update data 2211a further includes the change parameter. For example, the update data 2211a may include the ratio of the number of times that the loss value L_past increases due to the update of the lightweight image analysis model using one analyzed frame with respect to the number of times that the lightweight image analysis model is updated by using the one analyzed frame, as the parameter indicating the amount of change in the loss value L_pass.

Even in this case, the image analysis apparatus 2 is allowed to extract at least one update data 2211 (or update data 2211a, and hereinafter the same will apply in this paragraph) that satisfy the extraction condition based on the loss value L, as the update data 2211 used to update the lightweight image analysis model. Therefore, the analysis accuracy of the image analysis process using the lightweight image analysis model is improved, as compared with the case in which the lightweight image analysis model is updated by using the update data 2211 that are extracted randomly (i.e., without considering the loss value L) from the cache data 221. In other words, even in the modified example, it is possible to achive the same effect as that of the image analysis system SYS described above.

<5> Supplementary Notes

The whole or part of the example embodiments disclosed above can be described as, but not limited to, the following Supplementary Notes.

[Supplementary Note 1]

An image analysis apparatus comprising:
a controller; and
a storage unit,
wherein
the controller is programmed to sequentially obtain a plurality of image frames that constitute moving image data,
the controller is programmed to analyze the plurality of image frames by using a first image analysis model, the controller is programmed to analyze the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model, the storage unit stores therein a plurality of analyzed frames, which are image frames of the plurality of image frames that are already analyzed by using the first and second image analysis models, in association with an evaluation value for evaluating a result of an analysis performed by using the second image analysis model on the analyzed frames, the controller is programmed to extract at least one analyzed frame that satisfies a predetermined extraction condition based on the evaluation value, from the plurality of analyzed frames stored in the storage unit, the controller is programmed to update the second image analysis model by using a result of an analysis performed by using the first image analysis model on the extracted analyzed frame and a result of an analysis performed by using the first image analysis model on a new frame that is a newly obtained image frame of the plurality of image frames.

[Supplementary Note 2]

the extraction condition includes a condition based on magnitude of the evaluation value.

[Supplementary Note 3]

The image analysis apparatus according to Supplementary Note 2, wherein the evaluation value decreases more as a result of the analysis performed by using the second image analysis model becomes better, and the extraction condition includes at least one of a condition that a probability of extracting the analyzed frame increases as the associated evaluation value increases, a condition that the analyzed frame with which the associated evaluation value that is maximum or that is larger than a first threshold value is associated is extracted, and a condition that a predetermined number of the analyzed frames are extracted in descending order of the associated evaluation values.

[Supplementary Note 4]

The image analysis apparatus according to any one of Supplementary Notes 1 to 3, wherein the storage unit changes the evaluation value associated with the analyzed frame used to update the image analysis model, at each time when the image analysis model is updated, from a pre-update evaluation value, which is the evaluation value before the image analysis model is updated, to a post-update evaluation value, which is the evaluation value after the image analysis model is updated, and the extraction condition includes a condition based on a magnitude relationship between the pre-update evaluation value and the post-update evaluation value.

[Supplementary Note 5]

The image analysis apparatus according to Supplementary Note 4, wherein the evaluation value decreases more as a result of the analysis performed by using the second image analysis model becomes better, and the extraction condition includes a condition that the probability of extracting one analyzed frame of the plurality of analyzed frames increases as a ratio of the number of times that the post-update evaluation value associated with the one analyzed frame is larger than the pre-update evaluation value associated with the one analyzed frame due to the update of the second image analysis model using the one analyzed frame with respect to the number of times that the image analysis model is updated by using the one analyzed frame increases.

[Supplementary Note 6]

The image analysis apparatus according to any one of Supplementary Notes 1 to 5, wherein the controller is programmed to discard at least one analyzed frame that satisfies a predetermined discard condition based on the evaluation value, from the plurality of analyzed frames stored in the storage unit.

[Supplementary Note 7]

The image analysis apparatus according to Supplementary Note 6, wherein the discard condition includes a condition based on magnitude of the evaluation value.

[Supplementary Note 8]

The image analysis apparatus according to Supplementary Note 7, wherein the evaluation value decreases more as a result of the analysis performed by using the second image analysis model becomes better, and the discard condition includes at least one of a condition that a probability of discarding the analyzed frame increases as the associated evaluation value decreases, a condition that the analyzed frame with which the associated evaluation value that is minimum or that is less than a second threshold value is associated is discarded, and a condition that a predetermined number of the analyzed frames are discarded in ascending order of the associated evaluation value.

[Supplementary Note 9]

The image analysis apparatus according to any one of Supplementary Notes 6 to 8, wherein the storage unit changes the evaluation value associated with the analyzed frame used to update the image analysis model, at each time when the image analysis model is updated, from a pre-update evaluation value, which is the evaluation value before the image analysis model is updated, to a post-update evaluation value, which is the evaluation value after the image analysis model is updated, and the discard condition includes a condition based on a magnitude relationship between the pre-update evaluation value and the post-update evaluation value.

[Supplementary Note 10]

The image analysis apparatus according to Supplementary Note 9, wherein the evaluation value decreases more as a result of the analysis performed by using the second image analysis model becomes better, and the discard condition includes a condition that the probability of discarding one analyzed frame of the plurality of analyzed frames increases as a ratio of the number of times that the post-update evaluation value associated with the one analyzed frame is larger than the pre-update evaluation value associated with the one analyzed frame due to the update of the second image analysis model using the one analyzed frame, with respect to the number of times that the second image analysis model is updated by using the one analyzed frame decreases.

[Supplementary Note 11]

The image analysis apparatus according to any one of Supplementary Notes 1 to 10, wherein the update unit the controller is programmed to:

calculate a first evaluation value, which is the evaluation value for evaluating the result of the analysis performed by using the second image analysis model on the extracted analyzed frame, by using the result of the analysis performed by using the first image analysis model on the extracted analyzed frame;

calculate a second evaluation value, which is the evaluation value for evaluating the result of the analysis performed by using the second image analysis model on the new frame, by using the result of the analysis performed with the first image analysis model on the new frame;

perform a weighting process on the first and second evaluation values; and update the image analysis model by using the first and second evaluation values on which the weighting process is performed.

[Supplementary Note 12]

The image analysis apparatus according to Supplementary Note 11, wherein the controller is programmed to perform the weighting process such that weight of the first evaluation value is larger than weight of the second evaluation value.

[Supplementary Note 13]

An image analysis method, which is performed by a computer, including:

sequentially obtaining a plurality of image frames that constitute moving image data;

analyzing the plurality of image frames by using a first image analysis model;

analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model;

storing in a storage unit a plurality of analyzed frames, which are image frames of the plurality of image frames that are already analyzed by using the first and second image analysis models, in association with an evaluation value for evaluating a result of an analysis performed by using the second image analysis model on the analyzed frames;

extracting at least one analyzed frame that satisfies a predetermined extraction condition based on the evaluation value, from the plurality of analyzed frames stored in the storage unit; and updating the second image analysis model by using a result of an analysis performed by using the first image analysis model on the extracted analyzed frame and a result of an analysis performed by using the first image analysis model on a new frame that is a newly obtained image frame of the plurality of image frames.

[Supplementary Note 14]

A computer program that allows a computer to execute an image analysis method, the image analysis method including:

sequentially obtaining a plurality of image frames that constitute moving image data;

analyzing the plurality of image frames by using a first image analysis model;

analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model;

storing in a storage unit a plurality of analyzed frames, which are image frames of the plurality of image frames that are already analyzed by using the first and second image analysis models, in association with an evaluation value for evaluating a result of an analysis performed by using the second image analysis model on the analyzed frames;

extracting at least one analyzed frame that satisfies a predetermined extraction condition based on the evaluation value, from the plurality of analyzed frames stored in the storage unit; and updating the second image analysis model by using a result of an analysis performed by using the first image analysis model on the extracted analyzed frame and a result of an analysis performed by using the first image analysis model on a new frame that is a newly obtained image frame of the plurality of image frames.

[Supplementary Note 15]

A non-transitory program recording medium on which a computer program that allows a computer to execute an image analysis method is recorded, the image analysis method including:

sequentially obtaining a plurality of image frames that constitute moving image data;

analyzing the plurality of image frames by using a first image analysis model;

analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model;

storing in a storage unit a plurality of analyzed frames, which are image frames of the plurality of image frames that are already analyzed by using the first and second image analysis models, in association with an evaluation value for evaluating a result of an analysis performed by using the second image analysis model on the analyzed frames;

extracting at least one analyzed frame that satisfies a predetermined extraction condition based on the evaluation value, from the plurality of analyzed frames stored in the storage unit; and updating the second image analysis model by using a result of an analysis performed by using the first image analysis model on the extracted analyzed frame and a result of an analysis performed by using the first image analysis model on a new frame that is a newly obtained image frame of the plurality of image frames.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is not limited to the above described examples and is allowed to be changed, if desired, without departing from the essence or spirit of the invention which can be read from the claims and the entire specification. An image analysis apparatus, an image analysis method, a computer program, a computer program product and a program recording medium, which involve such changes, are also intended to be within the technical scope of the present invention.

DESCRIPTION OF REFERENCE NUMERALS

1 Camera
2 Image analysis apparatus
21 Arithmetic apparatus
211 High accuracy image analysis unit
212 Lightweight image analysis unit
213 Model update unit
214 Cache management unit
22 Storage apparatus
221 Cache data
2211 Update data

What is claimed is:

1. An image analysis apparatus comprising:

a controller; and at least one memory, wherein the controller is programmed to sequentially obtain a plurality of image frames that constitute moving image data, the controller is programmed to analyze the plurality of image frames by using a first image analysis model, the controller is programmed to analyze the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model, the at least one memory stores therein a plurality of analyzed frames, which are image frames of the plurality of image frames that are already analyzed by using the first and second image analysis models, in association with an evaluation value for evaluating a result of an analysis performed by using the second image analysis model on the analyzed frames, the controller is programmed to extract at least one analyzed frame that satisfies a predetermined extraction condition based on the evaluation value, from the plurality of analyzed frames stored in the at least one memory, the controller is programmed to update the second image analysis model by using a result of an analysis performed by using the first image analysis model on the extracted analyzed frame and a result of an analysis performed by using the first image analysis model on a new frame that is a newly obtained image frame of the plurality of image frames, the at least one memory changes the evaluation value associated with the analyzed frame used to update the image analysis model, at each time when the image analysis model is updated, from a pre-update evaluation value, which is the evaluation value before the image analysis model is updated, to a post-update evaluation value, which is the evaluation value after the image analysis model is updated, and the extraction condition includes a condition based on a magnitude relationship between the pre-update evaluation value and the post-update evaluation value.

2. The image analysis apparatus according to claim 1, wherein the evaluation value decreases more as a result of the analysis performed by using the second image analysis model becomes better, and the extraction condition includes at least one of a condition that a probability of extracting the analyzed frame increases as the associated evaluation value increases, a condition that the analyzed frame with which the associated evaluation value that is maximum or that is larger than a first threshold value is associated is extracted, and a condition that a predetermined number of the analyzed frames are extracted in descending order of the associated evaluation values.

3. The image analysis apparatus according to claim 1, wherein
the evaluation value decreases more as a result of the analysis performed by using the second image analysis model becomes better, and
the extraction condition includes a condition that the probability of extracting one analyzed frame of the plurality of analyzed frames increases as a ratio of the number of times that the post-update evaluation value associated with the one analyzed frame is larger than the pre-update evaluation value associated with the one analyzed frame due to the update of the second image analysis model using the one analyzed frame with respect to the number of times that the image analysis model is updated by using the one analyzed frame increases.

4. The image analysis apparatus according to claim 1, wherein
the controller is programmed to discard at least one analyzed frame that satisfies a predetermined discard condition based on the evaluation value, from the plurality of analyzed frames stored in the at least one memory.

5. The image analysis apparatus according to claim 4, wherein
the discard condition includes a condition based on magnitude of the evaluation value.

6. The image analysis apparatus according to claim 5, wherein
the evaluation value decreases more as a result of the analysis performed by using the second image analysis model becomes better, and
the discard condition includes at least one of a condition that a probability of discarding the analyzed frame increases as the associated evaluation value decreases, a condition that the analyzed frame with which the associated evaluation value that is minimum or that is less than a second threshold value is associated is discarded, and a condition that a predetermined number of the analyzed frames are discarded in ascending order of the associated evaluation value.

7. The image analysis apparatus according to claim 4, wherein
the discard condition includes a condition based on a magnitude relationship between the pre-update evaluation value and the post-update evaluation value.

8. The image analysis apparatus according to claim 7, wherein
the evaluation value decreases more as a result of the analysis performed by using the second image analysis model becomes better, and
the discard condition includes a condition that the probability of discarding one analyzed frame of the plurality of analyzed frames increases as a ratio of the number of times that the post-update evaluation value associated with the one analyzed frame is larger than the pre-update evaluation value associated with the one analyzed frame due to the update of the second image analysis model using the one analyzed frame, with respect to the number of times that the second image analysis model is updated by using the one analyzed frame decreases.

9. The image analysis apparatus according to claim 8, wherein
the controller is programmed to:
calculate a first evaluation value, which is the evaluation value for evaluating the result of the analysis performed by using the second image analysis model on the extracted analyzed frame, by using the result of the analysis performed by using the first image analysis model on the extracted analyzed frame;
calculate a second evaluation value, which is the evaluation value for evaluating the result of the analysis performed by using the second image analysis model on the new frame, by using the result of the analysis performed with the first image analysis model on the new frame;
perform a weighting process on the first and second evaluation values; and
update the image analysis model by using the first and second evaluation values on which the weighting process is performed.

10. The image analysis apparatus according to claim 9, wherein
the controller is programmed to perform the weighting process such that weight of the first evaluation value is larger than weight of the second evaluation value.

11. An image analysis method, which is performed by a computer, comprising:
sequentially obtaining a plurality of image frames that constitute moving image data;
analyzing the plurality of image frames by using a first image analysis model;
analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model;
storing in at least one memory a plurality of analyzed frames, which are image frames of the plurality of image frames that are already analyzed by using the first and second image analysis models, in association with an evaluation value for evaluating a result of an analysis performed by using the second image analysis model on the analyzed frames;
extracting at least one analyzed frame that satisfies a predetermined extraction condition based on the evaluation value, from the plurality of analyzed frames stored in the at least one memory;
updating the second image analysis model by using a result of an analysis performed by using the first image analysis model on the extracted analyzed frame and a result of an analysis performed by using the first image analysis model on a new frame that is a newly obtained image frame of the plurality of image frames, and
changing the evaluation value associated with the analyzed frame used to update the image analysis model, at each time when the image analysis model is updated, from a pre-update evaluation value, which is the evaluation value before the image analysis model is updated, to a post-update evaluation value, which is the evaluation value after the image analysis model is updated, wherein the extraction condition includes a condition based on a magnitude relationship between the pre-update evaluation value and the post-update evaluation value.

12. A non-transitory program recording medium on which a computer program for allowing a computer to execute an image analysis method is recorded, the image analysis method including:

sequentially obtaining a plurality of image frames that constitute moving image data;

analyzing the plurality of image frames by using a first image analysis model;

analyzing the plurality of image frames by using a second image analysis model, a processing speed of the second image analysis model is higher than that of the first image analysis model, an analysis accuracy of the second image analysis model is lower than that of the first image analysis model, the second image analysis model is allowed to be updated by using a result of an analysis performed by using the first image analysis model;

storing in at least one memory a plurality of analyzed frames, which are image frames of the plurality of image frames that are already analyzed by using the first and second image analysis models, in association with an evaluation value for evaluating a result of an analysis performed by using the second image analysis model on the analyzed frames;

extracting at least one analyzed frame that satisfies a predetermined extraction condition based on the evaluation value, from the plurality of analyzed frames stored in the at least one memory;

updating the second image analysis model by using a result of an analysis performed by using the first image analysis model on the extracted analyzed frame and a result of an analysis performed by using the first image analysis model on a new frame that is a newly obtained image frame of the plurality of image frames; and changing the evaluation value associated with the analyzed frame used to update the image analysis model, at each time when the image analysis model is updated, from a pre-update evaluation value, which is the evaluation value before the image analysis model is updated, to a post-update evaluation value, which is the evaluation value after the image analysis model is updated, wherein the extraction condition includes a condition based on a magnitude relationship between the pre-update evaluation value and the post-update evaluation value.

* * * * *